United States Patent
Umegård et al.

(10) Patent No.: US 7,600,485 B2
(45) Date of Patent: Oct. 13, 2009

(54) METHOD FOR CALIBRATION OF MILK METERS IN A MILKING SYSTEM

(75) Inventors: Anders Umegård, Rönninge (SE); Helmut Obermüller, Stockholm (SE)

(73) Assignee: Delaval Holding AB, Tumba (SE)

( * ) Notice: Subject to any disclaimer, the term of this patent is extended or adjusted under 35 U.S.C. 154(b) by 71 days.

(21) Appl. No.: 10/529,544

(22) PCT Filed: Sep. 29, 2003

(86) PCT No.: PCT/SE03/01506

§ 371 (c)(1),
(2), (4) Date: Jan. 20, 2006

(87) PCT Pub. No.: WO2004/028242

PCT Pub. Date: Apr. 8, 2004

(65) Prior Publication Data

US 2006/0137615 A1    Jun. 29, 2006

(30) Foreign Application Priority Data

Sep. 30, 2002   (SE)   .................... 0202879

(51) Int. Cl.
*A01J 3/00*       (2006.01)
*A01J 5/00*       (2006.01)
*G01F 25/00*      (2006.01)
*G01P 21/00*      (2006.01)

(52) U.S. Cl. .......... 119/14.18; 119/14.02; 119/DIG. 1; 119/14.15; 119/14.01; 73/1.34

(58) Field of Classification Search .............. 119/14.18, 119/14.02, DIG. 1, 14.15; 73/1.34
See application file for complete search history.

(56) References Cited

U.S. PATENT DOCUMENTS 4,101,056 A    7/1978    Mattimoe et al.

(Continued)

FOREIGN PATENT DOCUMENTS

EP    0416163    3/1991

(Continued)

OTHER PUBLICATIONS

Wendi et al., Prospects for automatic milking, EEAP Publication No. 65, pp. 338-345.

(Continued)

*Primary Examiner*—Michael R Mansen
*Assistant Examiner*—Kristen C Hayes
(74) *Attorney, Agent, or Firm*—Birch, Stewart, Kolasch & Birch, LLP (57) ABSTRACT

A method for calibrating milk meters in a milking system includes a milking station having at least one milk meter that measures a value of a milking performance of a milking animal. The method includes the steps: determining a reference value which reflects the amount of milk received from a number of milking animals during a selected time period in a reference unit, retrieving all measured values during the selected time period for each milk meter that by itself contribute to the amount of milk received by the reference unit, comparing the reference value with the sum of all retrieved measured values and calculating a correction function for one of the milk meters, and using the calculated correction function to adjust the measured value from the milk meter.

9 Claims, 4 Drawing Sheets

U.S. PATENT DOCUMENTS

| | | | |
|---|---|---|---|
| 4,173,892 A | 11/1979 | Khurgin et al. | |
| 4,358,947 A | 11/1982 | Greene et al. | |
| 4,433,577 A | 2/1984 | Khurgin et al. | |
| 4,467,657 A | 8/1984 | Olsson et al. | |
| 4,476,719 A | 10/1984 | Millar et al. | |
| 4,597,487 A | 7/1986 | Crosby et al. | |
| 4,816,767 A | 3/1989 | Cannon et al. | |
| 4,831,866 A | 5/1989 | Forkert et al. | |
| 4,989,445 A * | 2/1991 | Moskvin | 73/861 |
| 5,035,139 A * | 7/1991 | Hoefelmayr et al. | 73/223 |
| 5,080,040 A * | 1/1992 | van der Lely et al. | 119/14.09 |
| 5,161,483 A * | 11/1992 | Moskvin | 119/14.17 |
| 5,272,997 A * | 12/1993 | van der Lely et al. | 119/14.08 |
| 5,313,833 A | 5/1994 | Hoefelmayr et al. | |
| 5,455,606 A | 10/1995 | Keeling et al. | |
| 5,481,288 A | 1/1996 | Keeling et al. | |
| 5,720,236 A * | 2/1998 | Carrano et al. | 119/14.46 |
| 5,792,964 A | 8/1998 | van den Berg et al. | |
| 5,815,172 A | 9/1998 | Moh | |
| 5,996,529 A | 12/1999 | Sissom et al. | |
| 6,209,485 B1 * | 4/2001 | van der Lely et al. | 119/14.02 |
| 6,213,174 B1 | 4/2001 | Cook et al. | |
| 6,280,023 B1 | 8/2001 | Ufkes et al. | |
| 6,464,322 B2 | 10/2002 | Dunand et al. | |
| 6,597,998 B1 * | 7/2003 | Gonring | 702/55 |
| 6,705,247 B1 | 3/2004 | Heslin et al. | |
| 2006/0107899 A1 * | 5/2006 | Johannesson et al. | 119/14.18 |

FOREIGN PATENT DOCUMENTS

| | | | |
|---|---|---|---|
| EP | 0 713 641 A1 | | 5/1996 |
| EP | 1245150 | | 10/2002 |
| GB | 2195448 A | * | 4/1988 |
| GB | 2309308 | | 7/1997 |
| JP | 8110252 | | 4/1996 |
| NZ | 242924 | | 7/1995 |
| NZ | 507954 | | 11/2002 |
| WO | WO-02/100164 | | 12/2002 |

OTHER PUBLICATIONS

R. A. Sherlock et al.,"Prospects for automaitc milking", "Proceedings of the International Symposium on Prospects for Automatic Milking", Wageningen, Netherlands, Nov. 23-25, 1992. "Automated cow and machine performance monitoring in the Ruakura milk harvester" pp. 531-537.

http://mw1.merriam-webster.com/dictionary/calibrate.

Steven W. Eicker et al., "Proceedings from the Designing a Modern Milking Centre National Conference", Rochester, New York, Nov. 29-Dec. 1, 1995. "Computerized Parlor Data Collection and Use: Monitoring the Cows, the People, and the Parlor". pp. 154-159 - and 161-163.

R. A. Sherlock et al., "International Symposium on Bovine Mastitis", Indianapolis, Indiana, USA, Sep. 13-19, 1990. "New Developments in Milking Machine Design Related to Mastitis and Milk Quality", pp. 229-230 and 232-233.

* cited by examiner

METHOD FOR CALIBRATION OF MILK METERS IN A MILKING SYSTEM

TECHNICAL FIELD

The present invention relates to method for calibration of milk meters in a milking system, preferably an automatic milking system.

BACKGROUND TO THE INVENTION

In an automatic milking system, several milk meters are normally used to measure the amount of milk produced by the milking animals in a herd. Each milking animal may be milked using one or more of these milk meters depending on the milking occasion. The milk meters used are calibrated on a routine basis to ensure that each of them measures the correct amount. This routine will entail unnecessary calibration of some milk meters and at the same time there is a risk that other milk meters have been measuring an incorrect amount of milk during a period of time.

An obvious solution to reduce the number of incorrectly measuring milk meters is to decrease the time between routine calibrations of all milk meters. Another solution could be to regularly check and verify the function of each milk meter, to determine if a milk meter is in need of a calibration, but this will decrease the through put in the automatic milking system.

In an article with the title "A method for continuous automatic monitoring of accuracy of milk recording equipment", by G. Wendl, X Zenger and H. Auernhammer, published in EAAP Publication No 65, 1992, pages 338 to 345, a method for identifying a malfunctioning or deviating milk meter is disclosed. The method only describes how to identify a malfunctioning milk meter by using previously recorded actual milk yields and comparing them with calculated expected milk yields. The method may also be adapted to automatic milking systems if the time lapsed since the last milking is entered into the calculation of expected yield.

When a malfunctioning milk meter has been identified, a manual re-calibration of the malfunctioning milk meter is performed. The described method is limited in use since it assumes that the systematic error in measurement does not worsen at the same time on all milk meters, that an error in measurement will drift in one direction (directed error), and that the other milking equipment has no defects.

SUMMARY OF THE INVENTION

The object of the invention is to provide a method for automatically recalibrating at least one milk meter in a milking system.

An advantage with the present invention is that a verification of a properly functioning milking system is performed automatically on a regular basis.

Another advantage is that it is possible to detect and correct a systematic error in measurement that does worsen at the same time on all milk meters.

Still another advantage is that a manual calibration of a milk meter, which takes time and decreases the through-put in the milking system, is not necessary. The calibration is instead performed by adding a correction function to the output of the milk meter, which is in need of calibration, and is done fast and does not affect the through-put of the milking system.

BRIEF DESCRIPTION OF THE DRAWINGS

The invention will now be described in connection with the appended drawings, in which.

DETAILED DESCRIPTION OF PREFERRED EMBODIMENTS

Figure 1:
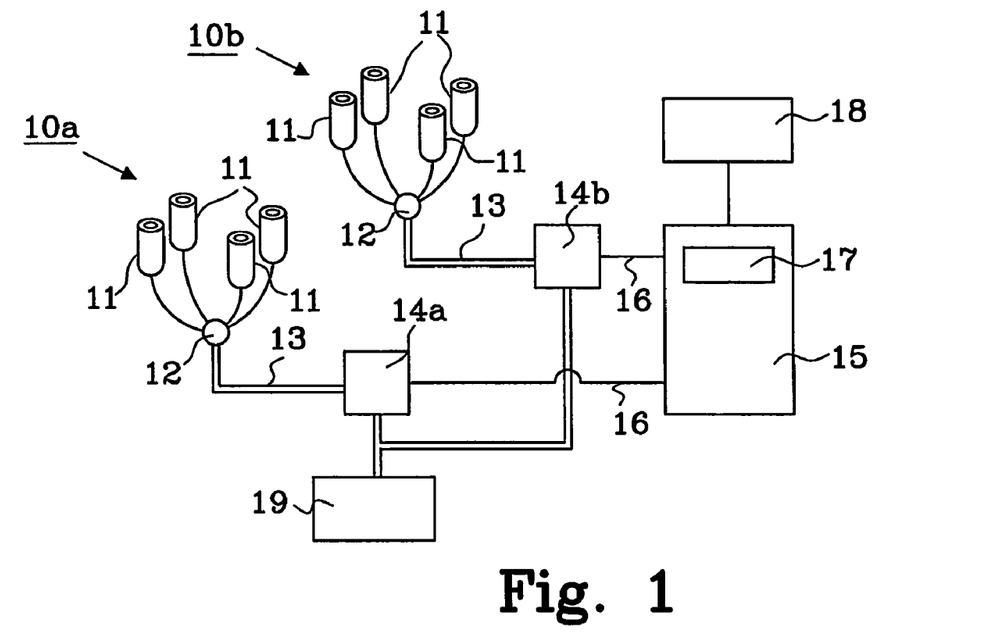
FIG. 1 shows a first embodiment of a milking system where the invention may be implemented.

FIG. 1 shows a first embodiment of a milking system comprising two milking stations 10a and 10b. Each milking station is placed within some type of milking parlour and comprises four teat cups 11, which are attached to the milking animal during milking operations, and a collector 12, such as a claw. The milk from all teat cups passes the collector 12 and is transported via line 13 to a milk meter 14a and 14b, respectively. Several milk meters may be used for measuring the milking performance in each milking station, e.g. a milk meter for each teat, but in this embodiment only one milk meter is used for each milking station 10a, 10b.

The milk meters 14a and 14b are separately and independently connected to a control unit 15 via a communication line 16. Each milk meter measures a value that corresponds to the milking performance of the milking animal in question, e.g. milk flow over time, the total weight or volume of the milk. The value corresponding to the milking performance of the animal is registered in the control unit 15, preferably in a memory or a database 17. The measured values are used in the method according to the invention.

Furthermore, the control unit 15 comprises means to calculate an expected milking performance value. The expected performance value is used to determine if a milk meter is in need of a calibration, as described below. A display 18 is also connected to the control unit 15.

When the milk has passed each milk meter 14a, 14b the milk is transported to a common receiver 19.

Figure 2:
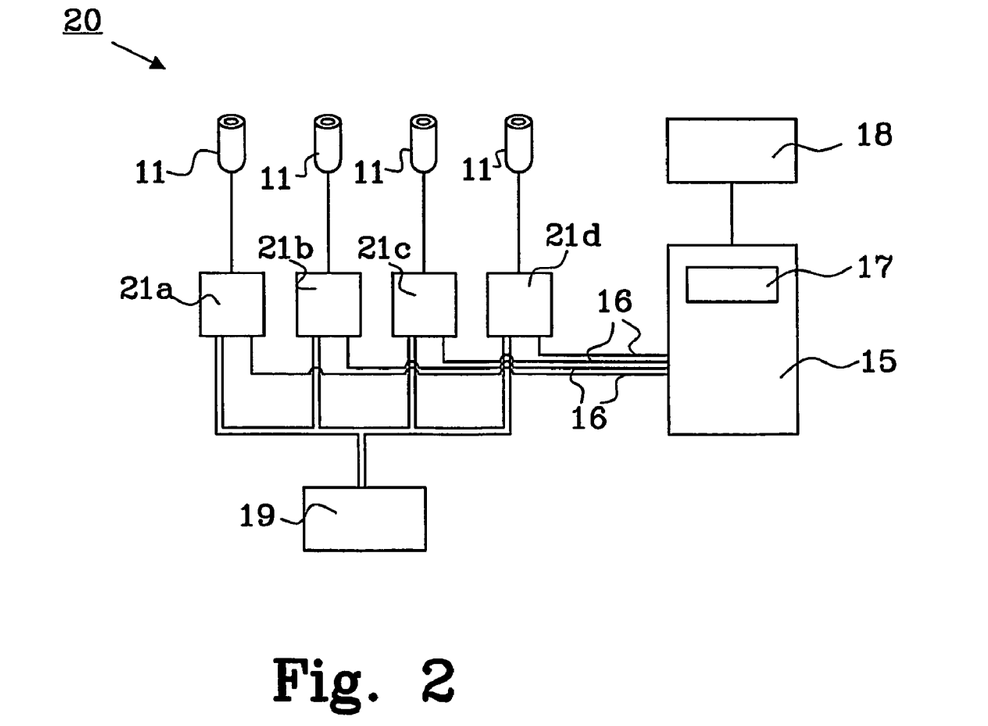
FIG. 2 shows a second embodiment of a milking system where the invention may be implemented.

FIG. 2 shows a second embodiment of a milking system comprising only one milking station 20, preferably placed in an automatic milking system using a robot. The milking station 20 comprises four teat cups 11, which are attached to the milking animal during milking operations. The teat cups are attached to a respective milk meter 21a, 21b, 21c and 21d, commonly denoted 21.

The milk meters are separately connected to a control unit 15 via a communication line 16. The milk meters 21 measures the milking performance of the respective teat of the milking animal. The measuring of the milking performance is performed in a manner previously described in connection with FIG. 1. The measured values are stored in a memory or a database 17 within the control unit 15 and are used in the method according to the invention.

Also in this embodiment the control unit 15 comprises means to calculate an expected milking performance value. The expected performance value is used to determine if a milk meter is in need of a calibration, as described below. A display 18 is also connected to the control unit 15.

Figure 3:
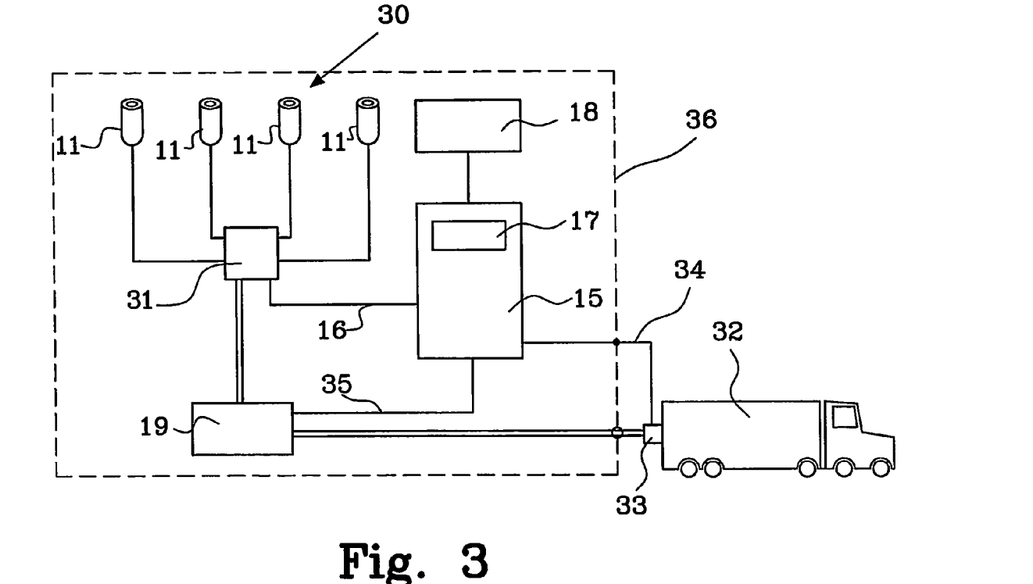
FIG. 3 shows a third embodiment of a milking system where the invention may be implemented.

FIG. 3 shows a third embodiment of the present invention comprising one milking station 30 having four teat cups 11, which are attached to the milking animal during milking operations. The teat cups are attached to a common milk meter 31.

The milk meter 31 is connected to a control unit 15 via a communication line 16. The milk meter 31 measures the milking performance of all teats of the milking animal, in a manner previously described in connection with FIG. 1. The measured value is stored in a memory or a database 17 within the control unit 15 and is used in the method according to the invention.

Also in this embodiment the control unit 15 comprises means to calculate an expected milking performance value. The expected performance value is used to determine if a milk meter is in need of a calibration, as described below. A display 18 is also connected to the control unit 15.

When the milk has passed the milk meter 31 the milk is transported to a common receiver 19, which may have a sensor (not shown), such as a float sensor, pressure sensors or a weight sensor, that measures the amount of milk in the receiver. The sensor, if present, is also connected to the control unit 15 via a communication line 35.

When a milk truck 32 arrives to a milking system 36, as indicated by the dashed line, to transport the milk in the receiver 19 to a dairy plant, the tank of the truck 32 is connected to the receiver 19 via a milk meter 33. The milk meter 33 is carried by the milk truck 32 and attached to the inlet of the tank. The purpose of the milk meter 33 is to measure the amount of milk collected from the milk system 36, i.e. the amount of milk in the receiver 19. This milk meter is normally calibrated often, and should therefore show an accurate value. The measured amount of the milk meter 33 may be fed back to the control unit 15 via communication line 34, but it is also possible to manually feed this information into the control unit 15.

Figure 4:
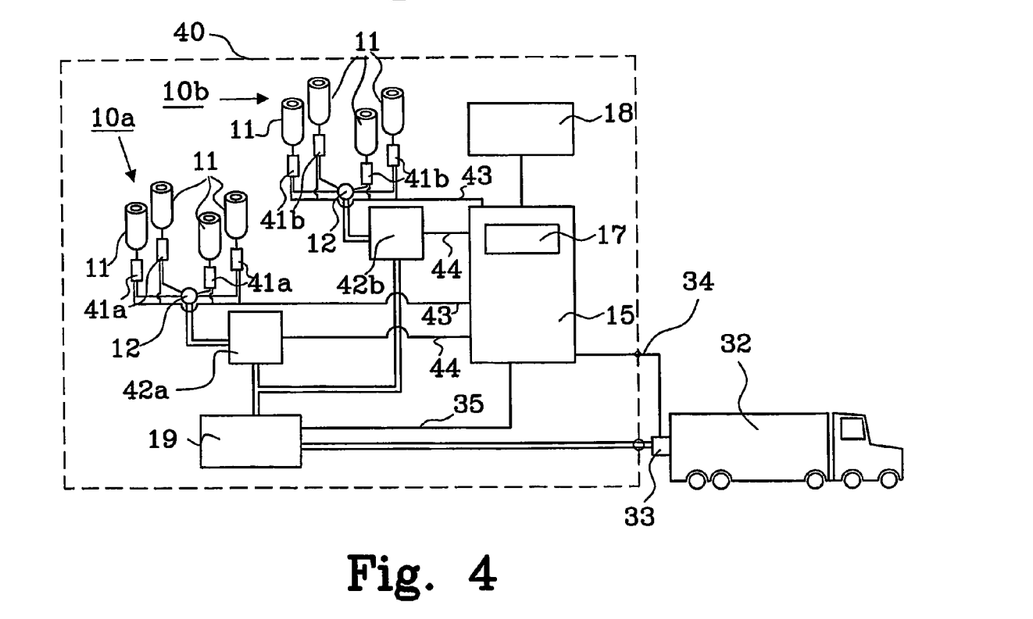
FIG. 4 shows a fourth embodiment of a milking system where the invention may be implemented.

FIG. 4 shows a fourth embodiment of the present invention comprising two milking stations 10a and 10b. Each milking station is placed in some type of milking parlour and each milking station comprises four teat cups 11, which are attached to the milking animal during milking operations. The teat cups of each milking station are connected to a first milk meter 41a and 41b. The milk from each first milk meter is thereafter transported to an intermediate milk meter 42a and 42b respectively, via a collector 12, which preferably contains the whole volume of the milk received from the udder. The milk meters 41a, 41b, 42a and 42b are provided with means to measure a value corresponding to the milk performance and the first milk meters preferably measures the milk flow and the intermediate milk meters preferably measures the weight of the milk collected from the milking animal. The first milk meters 41a, 41b are separately and independently connected to a control unit 15 via a communication line 43 and the intermediate milk meters 42a, 42b are separately connected to the control unit 15 via a communication line 44. Values from all milk meters corresponding to the milking performance of the animal in question are registered in the control unit 15, preferably in a memory or a database 17. The measured values are used in the method according to the invention.

The control unit 15 comprises means to calculate an expected milking performance value. The expected performance value is used to determine if a milk meter is in need of a calibration, as described below. A display 18 is also connected to the control unit 15.

When the milk has been collected in the intermediate milk meter 42a, 42b, and the amount of milk has been measured, the milk is transported to a common receiver 19, which in this embodiment has a sensor (not shown) that measures the total amount of milk from all present milking stations 10a, 10b. The sensor is also connected to the control unit 15 via a communication line 35.

When a milk truck 32 arrives at the milking system 40, indicated by the dashed line, to transport the milk in the receiver 19 to a dairy plant, the tank of the truck 32 is connected to the receiver 19 via a milk meter 33. The milk meter 33 is carried by the milk truck 32 and attached to the inlet of the tank. The purpose of the milk meter 33 is to measure the amount of milk collected from the milk system 40, i.e. the amount of milk in the receiver 19. This milk meter is normally calibrated often, and should therefore show an accurate value. The measured amount of the milk meter 33 may be fed back to the control unit 15 via communication line 34, but it is also possible to manually feed this information into the control unit 15.

The milk meters in the above described types of milking systems 36 and 40 may be monitored using the method according to the invention, which will be described in more detail below.

It is essential that the system comprises means to calculate an expected milking performance value at a given time for each animal in the system according to FIGS. 1, 3 and 4, and for each teat in the system according to FIG. 2, if the system should be able to monitor and individually recalibrate a milk meter that has an error in measurement. The expected performance value may be calculated in a number of ways, one of which is disclosed in the article previously mentioned in the background to the invention written by G. Wendl, X Zenger and H. Auernhammer.

Figure 5:
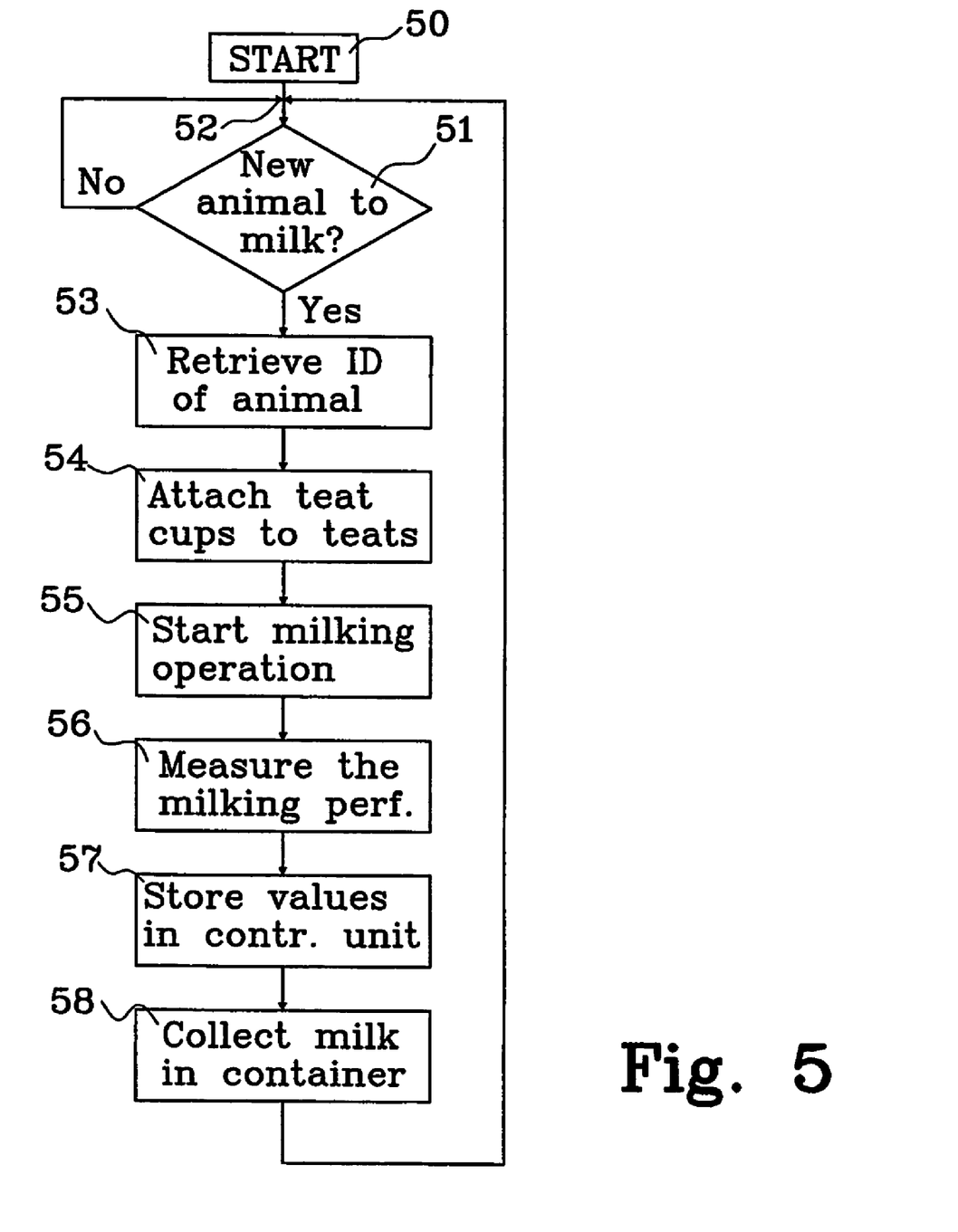
FIG. 5 shows a flow chart for measuring and storing milking performance values.

FIG. 5 shows a flow chart describing the method for measuring a milking performance and collecting the information in a memory/database. The flow starts, step 50, and the method determines if a new animal is present to be milked, step 51. If no new animal is present the flow is fed back to point 52. If a new animal is present the flow continuous to step 53, where the identity of the animal is read, e.g. by means of a transponder, tags or similar means.

When the identity is determined the teat cups are attached to the teats, step 54, and the milking operation, step 55, commences. The milking performance is measured for each milk meter present in the milking system, step 56. A milk meter may be measuring a parameter value that corresponds to the amount of milk from a part of the udder, or the total amount of milk from the whole udder, depending on the type of automatic milking system, see FIGS. 1 to 4. The values are stored in a memory or database, step 57, together with information regarding the milk meter used, the point of time and the identity of the animal. This information is needed to determine if a milk meter having an error in measurement.

The last step of the milking procedure is when the milk from all milk meters is collected in the common receiver, step 58, and the flow is thereafter fed back to point 52. The amount of milk collected in the receiver may also be measured and stored in the control unit 15, if a means to measure the amount of milk in the receiver is present.

The calculation of the expected performance value may, as mentioned before, be done in several ways and include different components.

The first component that needs to be taken into account is at least one previously measured and stored milking performance value for the same animal as the calculation is made. A good approximation of an expected performance value is to take the previously stored milking performance value and use it as the expected performance value for next milking occasion, since the change in performance value between milking occasions normally is only minor provided the time between the milking occasions is approximately the same. However this simple approach has the drawback that an incorrect expected performance value may be used if the previous measured performance value was measured by a milk meter being in need of a calibration.

A better way of acquiring a reasonably good expected performance value is to use several previously recorded milking performance values to calculate a mean value over a selected time period, provided the time between the milking occasions is approximately the same.

Figures 6, 7:
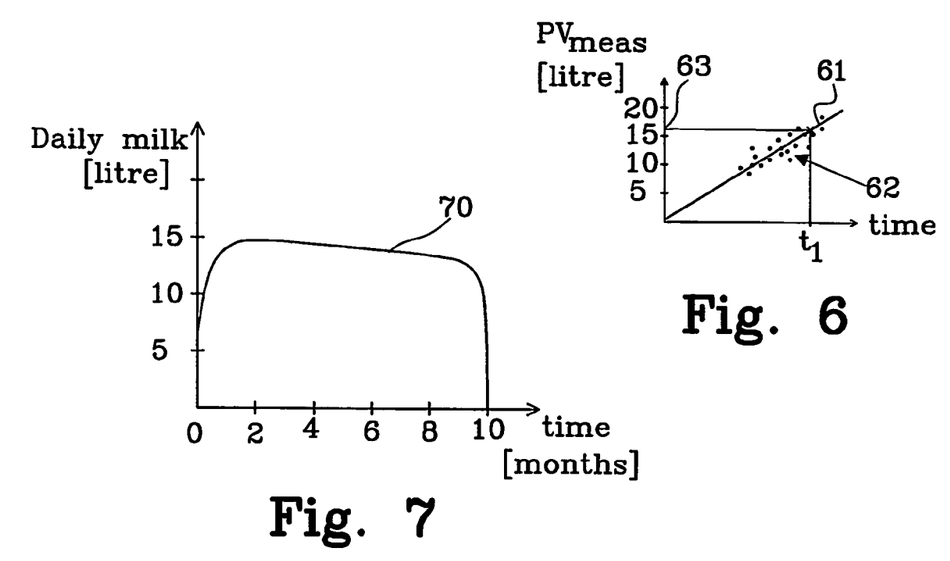
FIG. 6 shows a graph illustrating the method of calculating an expected performance value.
FIG. 7 shows an example of a lactation curve for a milking animal.

The time between milking occasions in a voluntary milking system is as a rule not the same. This is one of the advantages with that type of system, since different animals have different needs when to be milked. Some animals prefer to be milked rather often compared to others. The calculation of the first component as described above is thus not applicable. A different model is required. FIG. 6 shows a graph where several previous measured milking performance values are used to create an expected milking performance curve. This curve is created for a selected animal from which the milking performance value for next milking occasion may be determined. This is done by arranging, preferably in a best fit manor, a straight line 61 through origin of coordinates and using the previously measured values 62. The expected performance value 63 is thereafter determined at the time $t_1$, which in this example is approximately 16 liters due to the slope of the line 61. It is also possible to express the line 61 as an equation and thereafter calculate the expected performance value there from If many previously measured milking performance values are used to calculate the expected milking performance value, the influence of any incorrectly measured values will be reduced. Any previously measured milking performance value that deviate too much from the corresponding expected performance value should be eliminated when calculating coming expected performance values, as described below.

A second component that may be taken into account when calculating the expected milking performance value is the shape of the lactation curve of each animal, which means that the expected value will depend on where on the lactation curve the milking animal is. An example of a lactation curve 70 is shown in FIG. 7. As can be seen the amount of milk produced by a milking animal varies over time. The lactation curve could therefore be used to further improve the expected performance value.

A third component for calculating the expected performance value is to monitor the nutrition balance, e.g. water/feed intake of each milking animal, since this also will have impact on the amount of milk that could be produced.

A fourth component for calculating the expected performance value is to compensate for the lactation cycle of each milking animal, since this milking animal will produce a different amount of milk depending on which lactation curve the milking animal presently is in.

A fifth component for calculating the expected performance value is to compensate if an animal is sick. The ability to produce milk may be greatly reduced during sickness.

An improved way to determine if a milk meter needs to be calibrated may be performed by using the proposed method in the article mentioned in the background to the invention. The discrepancy between actual and expected milk yield is calculated from:

$$d_{ikl} = m_{ikl} - M_{ik},$$

where $d_{ikl}$ equals deviation of expected milk yield from actual milk yield of cow k on day i and meter l $m_{ikl}$ equals recorded actual milk yield of cow k on day i and meter l $M_{ik}$ equals expected milk yield of cow k on day i The reliability of the monitoring method depends on the calculation of a realistic expected value. The expected yield and its standard deviation is calculated from $$M_{ik} = \frac{m_{i-7;k} + m_{i-6;k} + \ldots + m_{i-1;k}}{u_{ik}}, \text{ and}$$

$$SM_{ik} = \sqrt{\frac{\sum (m_{i-x;k} - M_{ik})^2}{u_{ik}}},$$

where $M_{i-x;k}$ equals recorded actual milk yield of cow k on day i-x $SM_{ik}$ equals standard deviation of expected milk yield of cow k on day i $u_{ik}$ equals number of available amounts of milk from cow k during the previous 7 days The expected yield and its standard deviation is calculated across the previous 7 days in this example. To minimize the influence of any deviating milk meter, only amounts of milk that have been recorded on at least 3 different milk meters are used to determine if a specific milk meter has to be calibrated.

Extreme values have to be identified and eliminated to calculate the expected value. These extreme values may depend on the cow health, amount of nutrient received by the cow, environmental issues (e.g. introduction of a new member in the heard, etc.). The reason for the extreme values is not essential, but they must be eliminated to calculate a realistic expected value. Some criteria are presented in the article, such as:

only milk yield from $30^{th}$ to the $300^{th}$ days in lactation are used.

an expected value is valid only if the coefficient of variation ($SM_{ik}*100/M_{ik}$) is below 20%.

if the standard deviation of the available amounts of milk is more than 1.0, only the amounts in the range $M_{ik} \pm 2*SM_{ik}$ (i.e. 95.45% of normal distribution) are used to calculate a new expected value.

an expected yield is calculated only if at least 4 milk yield records are available across the previous 7 days, fulfilling the above mentioned conditions.

a deviation is only calculated if the actual milk yield is in the range $M_{ik} \pm 2*SM_{ik}$.

The calculation of average deviation for each milk meter and its standard deviation is calculated from:

$$D_{il} = \frac{d_{i-30;k;l} + d_{i-29;k;l} + \ldots + d_{i-1;k;l}}{x_{il}}, \text{ and}$$

$$SD_{il} = \sqrt{\frac{\sum (d_{ikl} - D_{il})^2}{x_{il} - 1}},$$

where $D_{il}$ equals running average of deviations of meter 1 at time i $SD_{il}$ equals standard deviation of deviations of meter 1 at time i $x_{il}$ equals number of available deviations of all cows during the previous 30 days (interval 1-30 to i−1) on meter 1

Additionally, it is assumed that the calculated deviations have a normal distribution. Therefore the hypothesis $H_0(D_{il}=0)$ can be tested against hypothesis $H_1(D_{il}\neq 0)$. If the hypothesis $H_0$ is rejected over a period of seven running days, a milk meter error is signalled.

When a milk meter has been determined to be in need of calibration, the system may either alert the farmer by sending a message to the display 18 or the system may automatically correct the malfunctioning milk meter by adding a correction function to the faulty, or deviating, milk meter. This is performed by the control unit 15.

To be able to correctly perform an automatic calibration, the system needs to have, in addition to the deviation values for each milk meter, access to a reference value which is used to control the calibration process.

Figure 8:
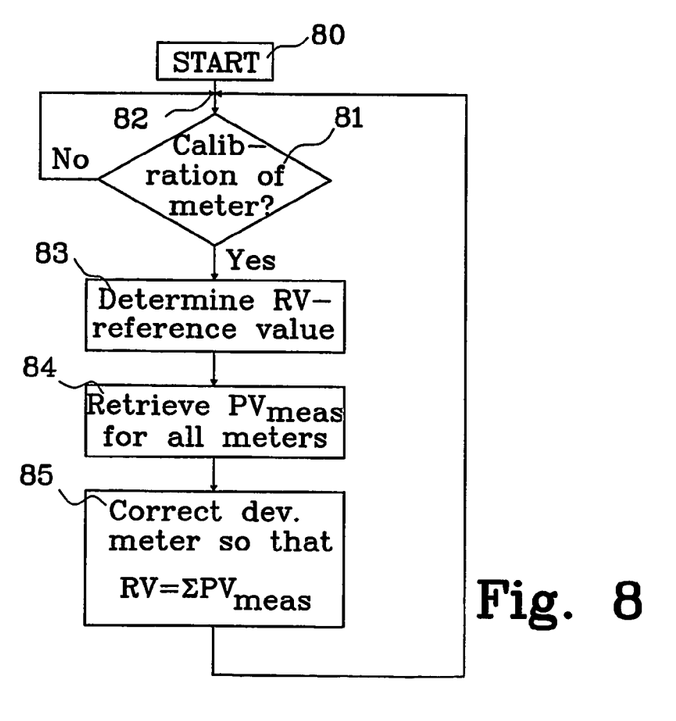
FIG. 8 shows a flow chart for calibration of a milk meter according to the invention.

FIG. 8 shows a flow chart describing the calibration process, when a milk meter has been found to deviate, as described above.

The flow starts at step 80 and the process awaits a decision to proceed with the calibration of a deviating milk meter in step 81. The flow is fed back in a loop to point 82 until a decision is made to proceed with calibration of one or several milk meters. The process then proceeds to step 83, where a reference value RV, which reflects the amount of milk received from a number of milking animals during a selected period in a reference unit, is determined. The following examples will exemplify how a reference value is determined.

The process thereafter proceeds to step 84, where the measured performance values $PV_{meas}$ are retrieved for each milk meter that by itself contribute to the amount of milk received by the reference unit. Each milk meter is directly or indirectly connected to the reference unit. In step 85, the sum of the retrieved measured performance values is compared with the reference value and if a specific milk meter has been found to be in need of calibration, that specific milk meter is adjusted so that the reference value is equal to the sum of the measured performance values. On the other hand if no milk meter has been found to be in need of calibration, but the reference value still differs from the sum of the retrieved measured performance values, then all milk meters may be adjusted so that the reference value is equal to the sum of the measured performance values, provided the reference value is considered to be an accurate value. If the reference value cannot be considered to be an accurate value the milk meters are not adjusted.

On the other hand if the reference value for instance has been determined by a newly calibrated milk meter (e.g. on a milk lorry) or the receiver 19 has several independent sensors that together are used to calculate the reference value, all milk meters may be adjusted if the reference value and the sum of the retrieved measured milking performance values differs more than the systems error margin. In particular, the correction function is selected to be equal to 1 unless the reference value (RV) deviates more than a predetermined amount from the sum of all retrieved measured milking performance values. In general, the predetermined amount is selected to be 5%. Also historic data from the milk meters may be used to determine if all milk meters should be adjusted.

The flow is fed back to point 82, awaiting a new decision to proceed with another calibration procedure.

The method described in the article mentioned in background to the invention, assumes that not all milk meters are faulty at the same time, but the method according to the invention actually takes care of that by using an internal reference value (e.g. obtained from the sensor in the receiver 19) or an external reference value, e.g. obtained from a milk meter 33 arranged on a milk truck 32 that regularly transfer the milk in the common receiver 19 to the truck 32. This milk meter is normally calibrated at regular intervals and thus produces a very reliable reference value when the common receiver 19 is emptied and transferred to the truck 32.

During milking, the system may detect that some milk is "milk not for consumption" e.g. contain bacteria etc., which means that the milk is discarded and thus not collected in the common receiver. When retrieving the measured performance values that are directly or indirectly connected to the common receiver 19, the performance value that corresponds to the amount of the milk not for consumption has to be omitted. If not, the comparison between the reference value and sum of the measured performance values is misleading. The measuring of the milk not for consumption may still be used to control the milk meters using the method according to the article.

As mentioned above, the reference value does not have to be an external value, but may advantageous be an internally generated value from a device, such as a sensor or milk meter, having at least one milk meter connected to it.

The method according to the invention will be described in the following by a number of examples.

Example 1

This example will be exemplified using the milking system in FIG. 1. Each milk meter 14a, 14b measures the milking performance of one animal at the time. A corresponding expected performance value is calculated using the proposed method from the article described above. The measured performance values are presented for both milk meters 14a, 14b in table 1.

The common receiver 19 in FIG. 1 is provided with means (not shown) to measure the amount of milk present in the receiver. This means is normally a sensor attached to the receiver, which typically measures the weight or volume of the milk, The means to measure the amount of milk in the receiver is connected to the control unit 15, and the signal from it is used as a reference value when performing the calibration procedure.

TABLE 1

| Milking occasion | Milk meter 14a | | Milk meter 14b | |
|---|---|---|---|---|
| | Milking animal | $PV_{meas}$ | Milking animal | $PV_{meas}$ |
| 1 | 1 | 4.3 | 2 | 4.4 |
| 2 | 6 | 4.7 | 7 | 5.3 |
| 3 | 4 | 4.8 | 5 | 3.9 |
| 4 | 7 | 3.7 | 8 | 6.5 |
| 5 | 8 | 4.6 | 9 | 3.5 |
| 6 | 10 | 5.0 | 1 | 6.4 |
| 7 | 2 | 4.5 | 3 | 5.6 |
| 8 | 5 | 3.8 | 6 | 5.2 |
| 9 | 3 | 4.6 | 4 | 4.7 |
| 10 | 9 | 5.0 | 10 | 6.2 |
| | $\Sigma PV_{meas,1}$ | 45.0 | $\Sigma PV_{meas,2}$ | 51.7 |

In this example the common receiver 19 did not contain any milk at the time for milking occasion #1, and the reference value (RV) after milking occasion 10 corresponded to 92.3 liters of milk.

If a milk meter is found to be in need of calibration, e.g. milk meter 14b has been found to deviate, the calibration process is initiated by proceeding to step 83 in FIG. 8. The RV is established to be 92.3 liters and milk meter 14a and 14b are both directly connected to the common receiver 19. Therefore the sum of the measured performance values for milk meter 14a and 14b is compared with the RV and the faulty milk meter is adjusted with a correction function C, e.g. a constant, an equation, etc. C is, in this example, calculated using the following relationship:

$$RV = PV_{meas,1} + C \cdot PV_{meas,2}$$

$$C = \frac{RV - PV_{meas,1}}{PV_{meas,2}} = \frac{92.3 - 45}{51.7} = 0.915$$

The sensor in the common receiver 19 may also in turn be calibrated when the receiver is emptied. The milk truck (not shown) that collects the milk from the milking system is provided with a milk meter attached at the inlet of the tank, which measures the flow of the milk when the receiver is emptied. The total amount of milk emptied from the receiver 19 should correspond to the amount of milk measured by the sensor prior to the transfer of milk to the milk truck. If they differ, the control unit may calculate a correction function for the sensor and thereby calibrate the means for measuring the amount in the receiver 19 at a regular basis, i.e. every time the receiver 19 is emptied.

A similar example could be made for the milking system illustrated in FIG. 2, with the exception that each milk meter only measures a quarter of the milk provided from the milking animal, since one milk meter is attached to each teat cup. The calibration procedure as described above is the same.

Example 2

This example will illustrate how all milk meters (including sensors in the receiver 19) in a milking system may be calibrated when a milk truck 32 empties the receiver 19.

In this example only one milking station is present, se FIG. 3, having only one milk meter 31 which communicates with the control unit 15, a receiver 19 provided with a sensor (not shown) which also communicates with the control unit 15. When a milk truck 32 arrives to collect the milk in the receiver 19, a milk meter 33, attached to the inlet of the milk tank on the milk truck, is connected to the control unit 15 so that the system may receive a value corresponding to the amount of milk transported into the milk truck 32.

During a calibration procedure performed within the system, using the measured milk volume in the receiver 19 as the internal reference value for calibrating the milk meter 31, the following correction function was calculated:

$$C = \frac{RV}{PV_{meas}} = \frac{92.3}{98.0} = 0.942$$

This correction function was stored in the memory 17 of the control unit 15. When the milk truck arrives and connects to the milking system, the following values was accessible to the control unit 15.

Milk volume in receiver (measured by the sensor): 183.5 liters

Sum of all actually measured milking performance values of the milk meter 31 since the last time the receiver 19 was emptied: 197.8 liters The correction function, previously determined using an internal reference value, is stored in the control unit, will correct the sum of all $PV_{meas}$ to be $0.942 \cdot 197.8 = 186.3$, which is close enough to the amount of milk measured by the sensor in the receiver 19.

When the milk in the receiver 19 has been transferred to the milk truck, the control unit receives the actual milk volume from the milk meter 33, which in this example is 201.3 liters.

The control unit selects the measured milk volume from milk meter 33 as an external reference value and uses this information to recalibrate the sensor in the receiver by adding a receiver correction function, which in this example is $201.3/183.5 = 1.097$. The correction function for the milk meter 31 is also corrected by multiplying the previous correction constant with the receiver constant, e.g. $0.942 \cdot 1.097 = 1.033$.

The control unit in the milking system will now use the correction functions when receiving measurement values from the milk meter 31 and the sensor to calculate a calibrated value for them. In this way there is no need to physically calibrate the milk meter or sensor, since an automatic adjustment, implemented as a software related calibration, is made in the control unit of the milking system.

Example 3

This last example is illustrated in connection with FIG. 4, which in its basic components is similar to the milking system in FIG. 1, with the exception that each teat cup 11 is connected to the collector 12 via a first milk meter 41a, 41b. The first milk meter 41a, 41b measures preferably the milk flow of each teat and the second milk meter 42a, 42b measures the weight or volume of the total amount of milk.

In this system calibration checks may be performed in a number of different ways, using the measured milking performance values of a milk meter to calibrate other milk meters attached to the milk meter that is used to establish the reference value. As an example the intermediate milk meter 42a may be used to determine if one of the first milk meters 41a needs to be calibrated, and the intermediate milk meter 42b may be used to calibrate any of the first milk meter 41b. The same may be applied for receiver 19 and intermediate milk meters 42a and 42b, as described in connection with example 3.

The examples that have been used to illustrate the method according to the invention have been simplified to clearly point out certain features.

The invention claimed is:

1. A method for calibrating at least one milk meter in a milking system comprising at least one milking station having at least one milk meter that measures at least one value of a parameter that corresponds to milking performance of a milking animal, said milking station is accessible to a herd of milking animals, said method comprising the steps of:

determining an internal or external reference value (RV) which reflects an amount of milk received from a plurality of milking animals during a selected time period in a reference unit, retrieving all measured values during a selected time period for said at least one milk meter that by itself contribute to the amount of milk received by said reference unit, comparing said reference value (RV) with a sum of all retrieved measured values and calculating a correction function for at least one of said milk meters which has been determined to be in a condition to cause errors in measurement, and therefore to be in need of a calibration, and calibrating said at least one of said milk meters by using said calculated correction function to adjust the measured value from said at least one milk meter.

2. The method according to claim 1, wherein said reference unit is selected to be a receiver that collects the milk in the system after milking of each milking animal, and said step of determining the reference value is performed by measuring the amount of the milk in the receiver, thus said reference value is an internal reference value.

3. The method according to claim 1, wherein said reference unit is selected to be an intermediate milk meter which is directly connected to said at least one milk meter, and said step of determining the reference value is performed by measuring a value of a milking performance parameter of said intermediate milk meter, thus said reference value is an internal reference value, which may be compared to the values measured by each milk meter.

4. The method according to claim 1, wherein said milking system is provided with an external unit being provided with an external milk meter to measure the amount of milk transferred from the milking system to said external unit, said step of determining the reference value (RV) is performed by measuring the amount of milk transferred from a receiver to the external unit using said external milk meter, thus said reference value is an external reference value.

5. The method according to claim 4, wherein the method further comprises the additional steps of:

determining the amount of milk in the receiver prior to transferring the milk to the external unit, comparing said amount of milk in the receiver with the external reference value, and calculating the correction function which is used when determining the amount of milk in the receiver.

6. The method according to claim 4, wherein said method further comprises the additional steps of re-calibrating the milk meters that by themselves contribute to the amount of milk received by the receiver when the correction function has been calculated which is used when determining the amount of milk in the receiver.

7. The method according to claim 1, wherein the correction function is selected to be equal to 1 unless the reference value (RV) deviate more than a predetermined amount from the sum of all retrieved measured milking performance values.

8. The method according to claim 7, wherein said predetermined amount is selected to be 5%.

9. The method according to claim 1, wherein the milking system comprises a control device connected to each milk meter, said internal or external reference value being accessible to said control unit, and said calculations of correction functions is performed in said control unit.

* * * * *